Aug. 21, 1928.                                                                            1,681,178
H. ERIKSON
VULCANIZING DEVICE FOR TIRE CASINGS
Filed Nov. 12, 1927          2 Sheets-Sheet 1
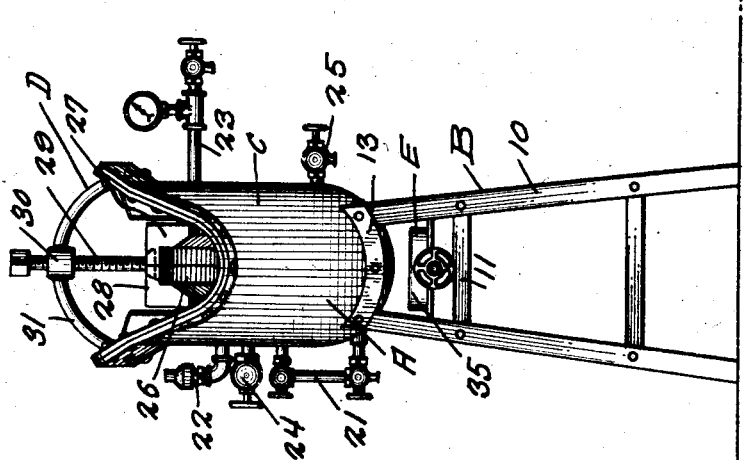
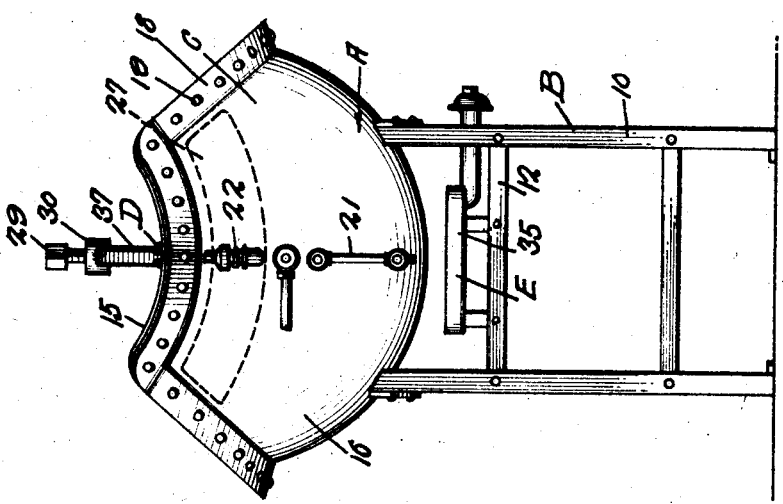
Harry Erikson,
INVENTOR.
Witnesses
C. C. Churchman Jr.
BY Richard B. Owen
ATTORNEYS.

Aug. 21, 1928.

H. ERIKSON 1,681,178

VULCANIZING DEVICE FOR TIRE CASINGS

Filed Nov. 12, 1927    2 Sheets-Sheet 2

Harry Erikson,
INVENTOR.

Witnesses
C. C. Churchman Jr.

BY Richard B. Owen
ATTORNEYS.

Patented Aug. 21, 1928.

1,681,178

UNITED STATES PATENT OFFICE.

HARRY ERIKSON, OF LOWELL, MASSACHUSETTS.

VULCANIZING DEVICE FOR TIRE CASINGS.

Application filed November 12, 1927. Serial No. 232,890.

This invention appertains to devices for repairing automobile tire casings or shoes and one of the primary objects of the present invention is to provide a vulcanizing machine having a self contained boiler for the generation of heat or steam, thereby eliminating the necessity of providing an extraneous boiler or equivalent apparatus.

Another salient object of the invention is the provision of a mold body having a cavity therein forming a boiler, with novel means for supporting the boiler and novel means for holding a tire casing in the mold.

A further object of the invention is the provision of a vulcanizing machine for tire casings embodying a novel cavity or boiler mold comprising a top plate or mold member and a cavity body riveted or otherwise secured to the plate, the cavity body forming in conjunction with a plate a complete boiler for the heating of said plate.

A further object of the invention is the provision of bead plates engaging the beads of a tire casing and for operating in conjunction with the mold plate, and a pressure screw for holding and urging the bead plates into engagement with the tire casing beads.

A still further object of the invention is to provide a novel tire casing vulcanizing machine of the above character, which is durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed, and illustrated in the accompanying drawing, in which drawing:

Figure 1 is a front elevation of the complete vulcanizing machine;

Figure 2 is an end elevation of the complete vulcanizing machine;

Figure 3:
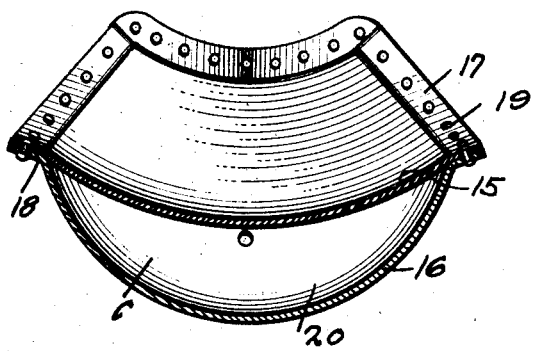
Figure 3 is a longitudinal section through a novel cavity mold with all fittings removed.
Figure 4:
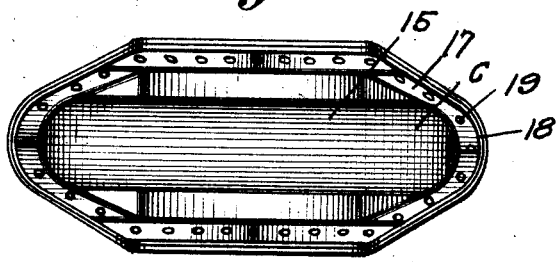
Figure 4 is a top plan view of a novel cavity mold.
Figure 5:
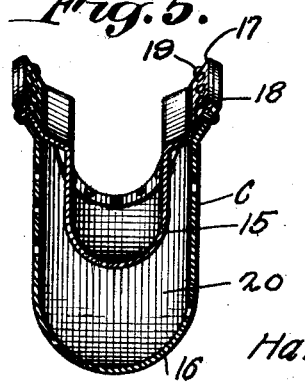
Figure 5 is a central transverse section through the novel cavity mold.

Referring to the drawings in detail, wherein similar reference characters designate corresponding parts throughout the several views, the letter A generally indicates the improved vulcanizing machine, which comprises a stand B, a cavity mold C arranged upon the stand B, a casing clamp D, and the heating device E for the cavity mold.

The stand B can be constructed from any desired material and in any desired way, but as shown is formed by diverging corner legs 10 which can be formed from angle iron. These legs 10 are connected together by transverse and longitudinally extending brace strips 11 and 12. Transverse arcuate top supporting strips 13 are also secured to the legs and form means for supporting the cavity mold C.

The cavity mold C forms the essential part of this invention and includes a self contained boiler, which is a further step forward in the art, as will be hereinafter pointed out.

The cavity mold C is preferably constructed from boiler plate and will comply with the specifications for miniature boilers.

This mold comprises an upper mold plate 15 and a lower cavity body portion 16. These plates are press drawn and drop forged. The mold plate 15 is curved arcuately both longitudinally and transversely to conform to a configuration of a tire casing or shoe and the edges of this plate are provided with marginal attaching flanges 17.

The cavity body 16 is likewise curved both transversely and longitudinally and its marginal edges are provided with attaching flanges 18. The flanges 17 and 18 can be riveted together as at 19, or can be welded, where welding is permissible. It is to be noted that the body 16 extends a considerable distance below the mold plate and forms a chamber 20 which chamber receives the water for the generation of steam, as will be later described, the complete mold forming a miniature boiler.

Suitable fittings are provided for the mold and boiler, such as a water gage 21, clearly shown in Figures 1 and 2. A safety valve 22 is carried by the upper end of the body 16 so as to prevent the steam pressure in the mold from rising beyond a predetermined point. A steam gage 23 can also be connected with the upper end of the mold. A water filler valve 24 is provided for the boiler and a water level valve 25 is likewise provided.

In order to effectively hold a tire casing in proper position in the mold, a bead clamping mechanism D is provided. This bead clamping mechanism D comprises a pair of bead plates 26 and 27. The bead plates 26 and 27 are curved to conform to the configuration of a tire casing and are preferably shaped to match a bead of a tire casing being repaired.

Pressure blocks 28 are carried by the pressure screw 29 for engaging the bead plates 26 and 27 and this screw is supported by a nut 30 threaded thereon and connected with a supporting bracket 31, which has one end hingedly connected to the mold and its opposite end detachably connected to the mold, whereby the bracket can be swung laterally off the mold to permit the placing of a tire casing in position in the mold.

Heating means E is provided for the boiler and is connected with the stand 10 in any desired way. The heating means E can be of any desired type, such as a kerosene or gasoline burner, or as shown an illuminating gas burner 35.

In operation of the improved device the boiler is partly filled with water, a sufficient space being left in the chamber 20 for the accumulation of steam and the burner 35 is then lit. After the boiler has become heated and a sufficient quantity of steam has been generated by the heating device E, the tire casing is placed on the plate 15 and treated in the usual way, as well known by persons skilled in this art and the casing is held in place by means of the bead plates 26 and 27.

An air bag (not shown) is placed in the tire casing, so that the casing will be held in firm contact with the heated surface of the mold plate 15.

By having the boiler a direct part of the mold, all extraneous parts are eliminated and further the heat from the boiler itself is utilized for heating the mold plate which prevents waste of heat and insures the proper temperature of the mold plate 15.

From the foregoing, it can be seen that a compact and simple tire casing vulcanizing machine has been provided which will effectively accomplish the purpose intended.

Changes in details may be made without departing from the spirit or the scope of this invention, but what I claim as new is:

In a tire vulcanizing device, a combined mold plate and boiler comprising an independent top plate of sheet metal forming a mold, a body portion of sheet metal defining a boiler, and out-turned flanges on the body concentric with the sides of the top plate, said top plate and flanges being rigidly secured together.

In testimony whereof I affix my signature.

HARRY ERIKSON.